United States Patent [11] 3,577,796

[72] Inventor Werner Eissfeldt
 Wiesbaden-Rambach, Germany
[21] Appl. No. 848,853
[22] Filed Aug. 11, 1969
[45] Patented May 4, 1971
[73] Assignee Nirona-Werke, Nier & Ehmer KG
 Bleidenstadt, Germany
[32] Priority Aug. 13, 1968, July 16, 1969
[33] Germany
[31] P 17 52 958.7, P 19 36 170.7

[54] SPINDLE GUIDE
 12 Claims, 11 Drawing Figs.
[52] U.S. Cl. .................................................. 74/459,
 74/424.8
[51] Int. Cl. .................................................. F16h 1/18,
 F16h 55/22
[50] Field of Search .......................................... 74/424.8,
 424 (A), 424 (NR), 459

[56] References Cited
 UNITED STATES PATENTS
 2,069,471 2/1937 Baker .......................... 74/459
 2,082,433 6/1937 Whitcomb ................... 74/459X
 3,186,250 6/1965 Boutwell ...................... 74/459
 FOREIGN PATENTS
 621,168 8/1962 Belgium ....................... 74/424.8(A)

562,932 7/1944 Great Britain ................. 74/459
Primary Examiner—Leonard H. Gerin
Attorney—Darbo, Robertson and Vandenburgh ABSTRACT: An antifriction nut and threaded spindle assembly uses a plurality of continuously recirculating roller bodies traveling through a plurality of individually continuous ways. The ways are positioned sequentially along the axis of the spindle. The ways are each formed by a groove in the nut body and a retainer strip surrounding the groove. That portion of the strip adjacent the spindle fits between the lands of the spindle threads. The nut is split and a clamping ring, whole or split, circumscribes the nut for compressing the nut about the spindle for control of play between the nut and spindle. In one embodiment the nut is formed in two halves having a plurality of the individually continuous ways in each half. The halves (as seen in cross section) may have an inner curvature formed about the axis of the spindle and outer curvature formed about axes spaced from the spindle axis in the direction of the respective nut half. In some embodiments the roller bodies are each of truncated conical configuration with the small end directed toward the spindle when in operative contact with the spindle. For heavy loads the truncated conical roller bodies meet the lands of the spindle threads in a line contact such that the lines extended, along with the conical axis, meet at a point on the spindle axis. The large end of the truncated conical bodies is concave and in the return portion of the way contact a crown on the portion of the nut defining the return portion of the way.

INVENTOR:
Werner Eissfeldt
BY
Darby, Robertson & Vandenburgh

INVENTOR:
Werner Eissfeldt
BY
Darbo, Robertson & Vandenburgh.
attys.

Fig. 11

SPINDLE GUIDE

BACKGROUND OF THE INVENTION AND SUMMARY OF THE INVENTION

The present invention relates to a spindle guide in which a nut is guided on a threaded spindle via roller bodies running on a closed way.

With prior spindle guides of the type indicated, the roller bodies are arranged along a helically-shaped way in the thread grooves of the threaded spindle and nut. However, since the roller bodies only have half the circumferential speed of the nut, they would move out of the nut after a certain length of travel. Therefore, the roller bodies, after having almost passed through the turns of the nut, are returned on a way in the nut or through a tube outwardly of the nut to the other end thereof. Thereby, the attainable accuracy involves a bearing play. Therefore, to eliminate this bearing play, with the prior art arrangements two successively arranged nuts are provided which must be rotated with respect to each other.

Thus, a double length of the nut arrangement is obtained, which does, however, not produce a correspondingly increased load capacity since only a respective one of the nuts with the associated roller bodies takes up the forces in each direction. For many purposes, for instance in the case of machine tools, a divisible nut is required. Such a nut could not be provided with the prior roller body spindle guides.

It is an object of the present invention to provide a spindle guide which permits avoiding or solving the described problems of the prior roller body spindle guides.

The spindle guide according to the invention is characterized in that the nut is divided or split and the roller bodies are guided in a plurality of separate ways, each of which extends arcuately in the thread between nut and the threaded spindle on only a portion of the circumference and is then returned on the outside of the nut.

The spindle guide according to the invention permits the use of a divided nut. Moreover, it is possible to avoid play in the spindle guide in that in a further modification of the invention the parts of the nut can be clamped radially with respect to each other in order to avoid bearing play.

Thus, the bearing play is eliminated by a radial clamping of the parts of the divided or split nut. It is not necessary to provide a second nut clamped in an axial direction with respect to the original nut in order to avoid bearing play.

Clamping may be accomplished in such a manner that the nut, as a whole, is of a conical basic shape and is surrounded by a correspondingly conical outer ring which can be tightened against the nut by a threaded ring.

In a further modification of the invention, the arrangement may be provided such that the roller bodies of each way are surrounded by a closed form strip which, in the area of the spindle thread only, has a width which does not interfere with the abutment of the roller bodies against the thread grooves.

The roller bodies may be designed as tapered rollers. In such a case, the arrangement is advantageously provided whereby the extensions of the lines of contact of the side faces of the thread groove of the threaded spindle or nut and the taper roller, as well as the axes of the taper rollers, each intersect at a common point disposed on the center axis of the threaded spindle and of the nut.

DESCRIPTION OF SPECIFIC EMBODIMENTS

Figure 1:
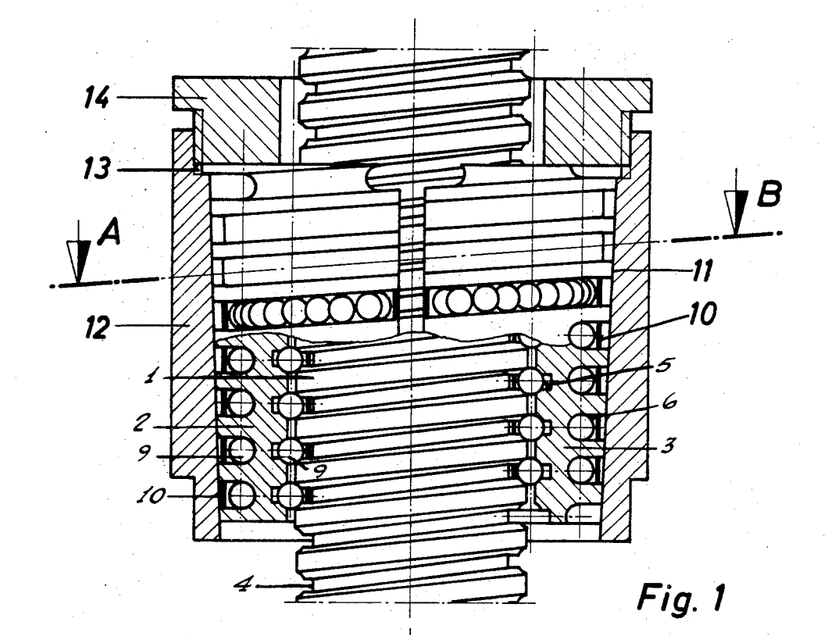
FIG. 1 is a longitudinal section through a spindle guide constructed in accordance with the present invention.
Figure 2:
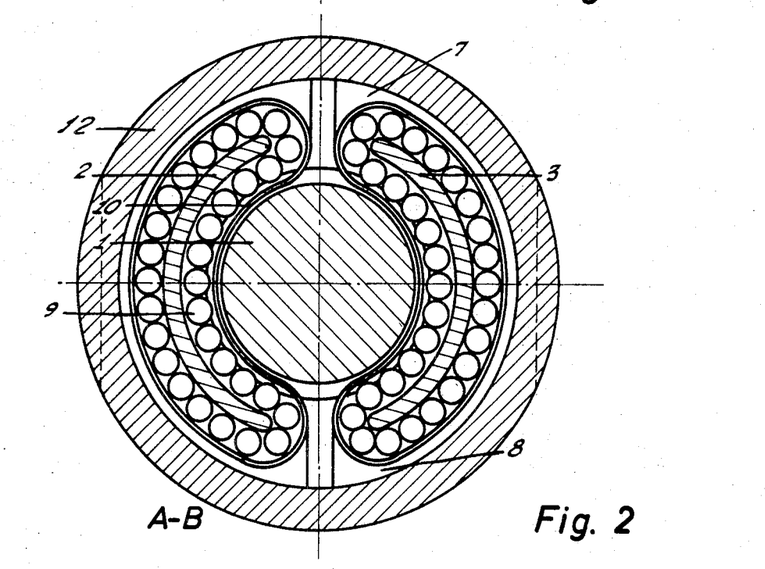
FIG. 2 is a section along the line A–B of FIG 1.

In the embodiment according to the FIGS. 1 and 2, a threaded spindle 1 is surrounded by two nut halves 2 and 3. The threaded spindle 1 includes a thread with thread grooves 4. The nut halves 2 and 3 include a plurality of halfways 5 parallel to each other. The halfways 5 each form a full way in conjunction with groove 4 of spindle 1. Each of the halfways 5 extends obliquely upwardly on the inside of a nut half, through approximately 180°, and is continuous with enclosed ways 6 which extend downwardly on the outside of the nut then returns to the beginning of the halfway 5. The ways 6 are "enclosed" in the sense that the roller bodies are trapped therein (except for ingress and egress through the ends where they communicate with the halfways 5).

The nut including the two halves 2 and 3 and the ways 5 and 6 are fabricated as follows: After making the ways on the inside as at 5 and on the outside as at 6, the nut is cut lengthwise. Thereby, the ways can be fabricated without extreme accuracy. On the surfaces at the cut, semicircular ball deflecting grooves are recessed as at 7 and 8 (FIG. 2). Also, the fabrication of these ball deflecting grooves does not require high accuracy or finishing. The thread grooves 4 of the spindle 1 and the inner halfways 5 of the nut 2, 3 must be hardened and ground. Thus, on each nut half 2 or 3 a plurality of kidney-shaped guideways are obtained for the balls 9. These guideways are formed by the inner halfways 5, the ball deflecting grooves 7 and 8 and the outer ways 6. Upon a relative rotation of nut and spindle, the balls 9, for instance, move upwardly between the thread grooves 4 and the halfways 5, then through the ball deflecting groove 7 to the outer way 6 and downwardly again in the outer way 6 and through the ball deflecting groove 8 back to the beginning of the halfway 5. To hold the ball in its way, a strip 10 forming a retainer is placed around the balls. As can be seen from FIG. 1, the inward portion of the strip 10 has only such a vertical depth that it fits within the thread grooves 4 of the spindle 1 and does not prevent the balls 9 from abutting against the lands defining the thread grooves 4. The portions of strip 10 that are external of the grooves 4 has a greater vertical depth to safely hold the balls 9 in the ways 6.

In order to avoid a bearing play, the nut 2, 3, as a whole, has a slightly conically exterior surface 11 and is surrounded by an outer ring 12 having a correspondingly conical inner surface. At one end the outer ring 12 is provided with threads 13 into which is screwed a threaded ring 14. Ring 14 bears against the end face of the nut 2, 3. By tightening the ring 14, the outer ring 12 is pulled upwardly relatively to the nut 2, 3 as viewed in FIG. 1, whereby the two parts 2 and 3 of the nut are compressed radially with respect to each other to clamp the spindle therebetween. This ensures that the balls 9, disposed on the inside between the nut parts 2 and 3 on the one hand and the spindle 1 on the other hand, will abut the spindle and nut without play. This, therefore, leads to a neat guide without bearing play. All balls 9 bear in both axial directions of force, and two nuts being clamped axially with respect to each other are not required.

Figure 3:
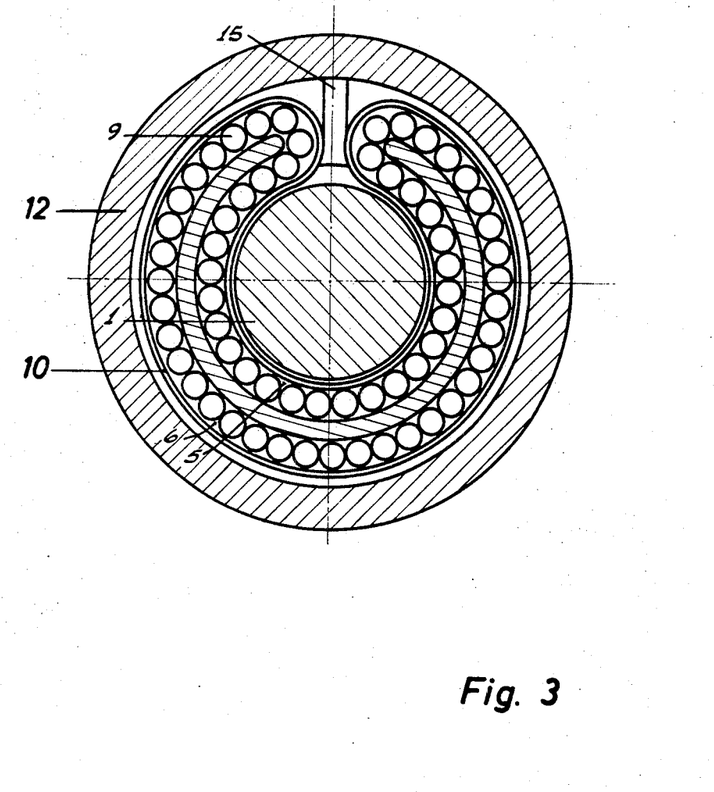
FIG. 3 illustrates a modified embodied form of the invention including only a split nut.

The arrangement according to FIG. 3 (shown in a sectional view similar to FIG. 2) closely resembles the arrangement according to the FIGS. 1 and 2, and like parts are denoted by like reference numbers. The only difference is that the nut is not in two parts as in the arrangement of FIG. 2, but is only split on one side as at 15. Accordingly, the way of the balls 9 extends through almost 360°.

Figure 4:
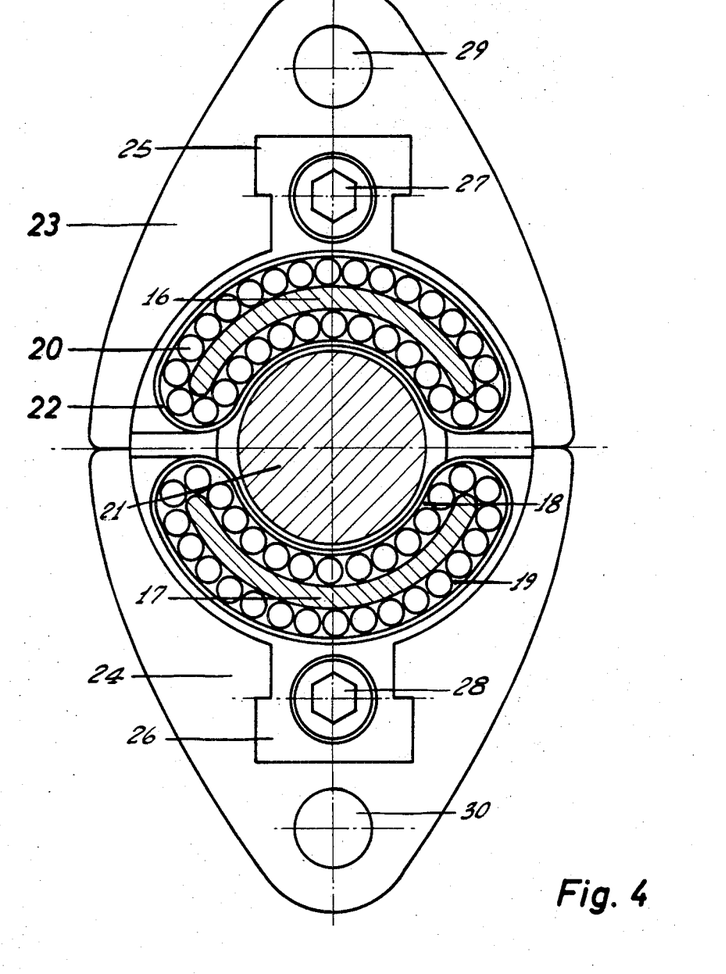
FIG. 4 illustrates a spindle guide preferably adapted for machine tools including a completely divisible nut.

FIG. 4 shows an arrangement particularly adapted for use in machine tools. In such an application a completely divisible nut is required. Such a nut is not feasible in prior roller body spindle guides, but may be achieved with an arrangement according to the present invention. In FIG. 4 there are two nut halves 16 and 17, each having inner halfways 18 continuous with outer ways 19 similarly to the structure of FIGS. 1 and 2. These nut halves are assembled together around a threaded spindle 21 with the interposition of balls 20. The balls 20 are held in place by strips 22 (similar to retainers 10 in FIGS. 1 and 2). The nut halves 16 and 17 are each undetachably mounted on a housing half 23 and 24 respectively by means of a respective T-groove guide 25 and 26.

Similarly to the arrangement of FIG. 1, the nut 16, 17, as a whole, has a slightly conical exterior. The housing parts 23 and 24 are designed accordingly. To avoid bearing play, the nut halves are clamped with respect to each other and to the spindle 21 by clamping screws 27 and 28. The bores 29 and 30 provided in the housing halves 23 and 24 are used to support the whole arrangement in a chuck associated with the machine tool.

Figure 5:
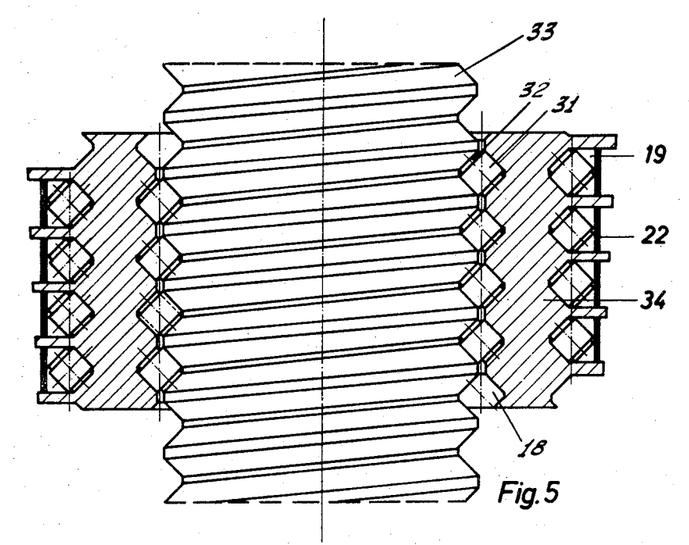
FIG. 5 is a longitudinal section through an embodied form of the invention in which cylindrical rollers are provided as roller bodies.
Figure 6:
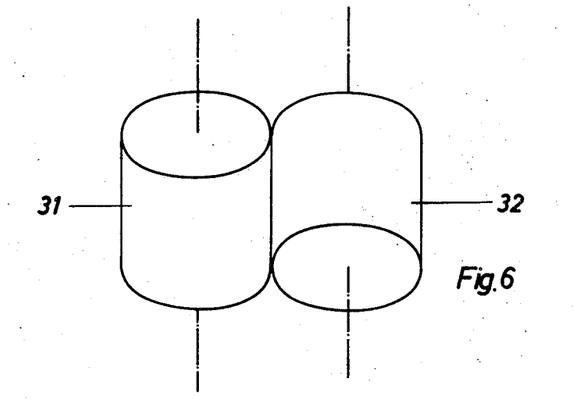
FIG. 6 is a perspective representation showing the crossed arrangement of successive cylindrical rollers with respect to each other.

The arrangement according to the FIGS. 5 and 6 operates with cylindrical rollers instead of with the balls. As compared to the ball, the roller has the disadvantage of not bearing crosswise at four points, but has the advantage instead of having two bearing line supports. For providing a functionable element herein, an arrangement known per se including rollers 31 and 32 crossed to each other (FIG. 6) must, however, be used. For each direction of pressure between the spindle 33 and nut 34 (thus, from above downwardly or from below upwardly in FIG. 5) only each second roller is bearing each time. With respect to forces, an advantage is obtained by the line support of the rollers. However, such a roller can run correctly only at one single point of its cross section. All other points of the line support are subjected to a certain sliding friction, since the shape, position and disposition of the bearing surfaces on the spindle and nut do not conform to the laws of crossed-axes conical rotation. The arrangement with cylindrical rollers of the type as indicated in the FIGS. 5 and 6 is therefore only suitable for relatively small forces. Otherwise, the arrangement according to the FIGS. 5 and 6 is similar to that of FIG. 4, like parts being denoted by like reference numerals.

Figure 7:
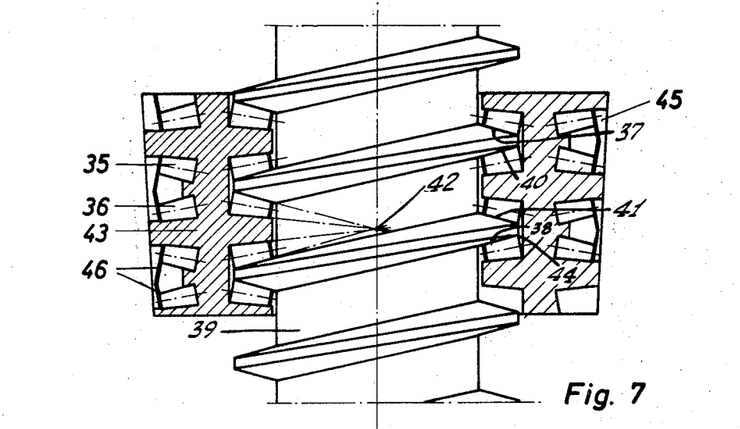
FIG. 7 illustrates a further embodied form of the invention including tapered rollers.

FIG. 7 shows an arrangement according to the invention which is adapted for transmitting relatively large forces. Therein, pairs of tapered rollers 35 and 36 are used. The tapered (truncated conical) rollers abut against the side faces 37 and 38 of the lands of the threaded spindle 39 along the lines of contact 40, 41. The arrangement is such that the extensions of the lines of contact 40 or 41 of the tapered rollers 35, 36 with the sidewalls 37, 38 of a land of the spindle 39 and the axes of the tapered rollers intersect in a common point 42 disposed on the axis of the threaded spindle 39 and the nut 43. With this arrangement, a rolling of the tapered rollers without undesired friction is obtained.

Also with this arrangement the tapered rollers run in inner halfways 44 through approximately 180° on the inside of the nut 43 and are then returned in outer ways 45. Also with this arrangement, a strip 46 placed around the tapered rollers retains the rollers in the nut 43 without preventing the generated surfaces of the rollers from abutting against the side faces of the lands of the spindle 39.

Figure 8:
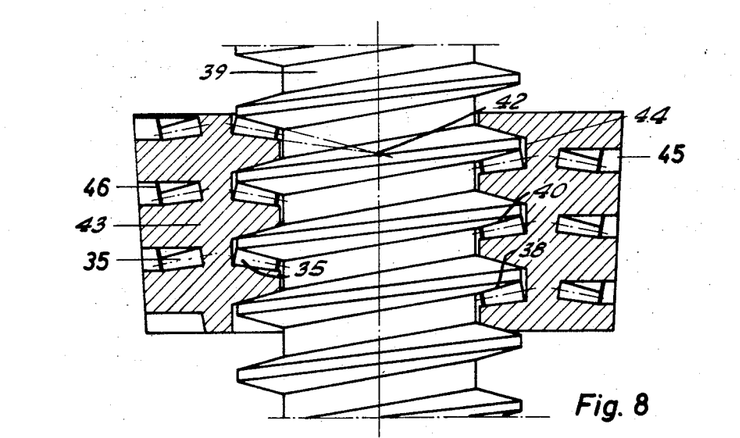
FIG. 8 illustrates an embodied form including tapered rollers, in which only a unilateral axial load of the spindle or nut is acting.

FIG. 8 shows an arrangement which is similar to that of FIG. 7, like parts again being denoted by like reference numerals. This arrangement is only adapted for taking a unilateral axial load, namely for taking a force, for instance, acting axially on the spindle 39 from above downwardly, as viewed in FIG. 8.

Figure 9:
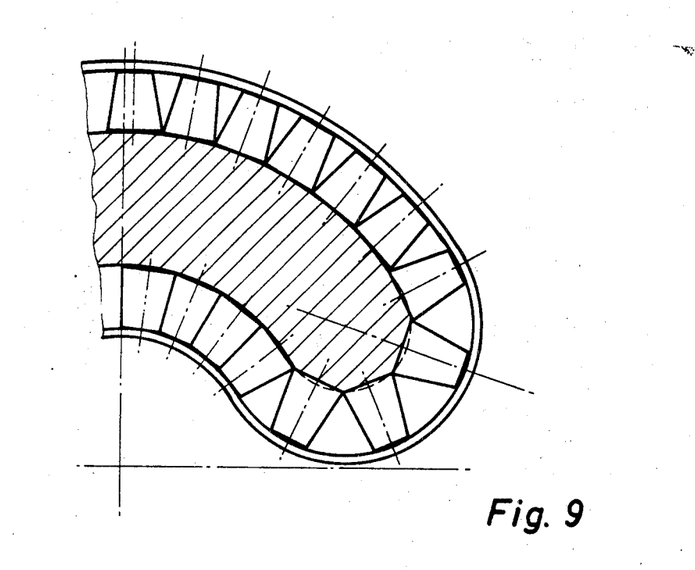
FIG. 9 illustrates the guide or way of the tapered rollers in their way.
Figure 10:
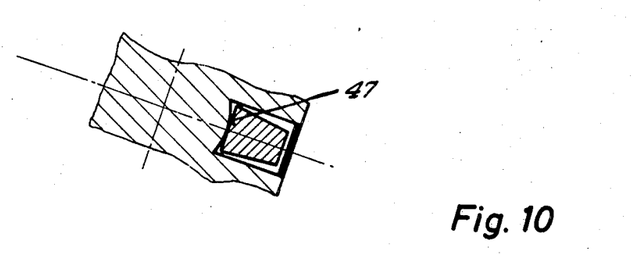
FIG. 10 is a vertical section through a tapered roller and its guide.

FIG. 9 shows a broken-away cross section through a nut part illustrating the guide of the tapered rollers. As can be seen from FIG. 10, the larger surface 47 of the tapered rollers is concave. The bottom of the guide groove in the nut is designed toroidally accordingly. Thereby, the tapered rollers with their larger front faces abut across their longitudinal diameter corresponding to the wall for the full length thereof so that the tapered rollers can be moved without tilting.

Due to the different stress conditions at the ends and in the center of the nut halves, deformation upon adjustment of play may not be uniform so that a noncircularly cylindrical shape of the inner generated surface of the nut is obtained which does not correspond anymore to the cylindrical generated surface of the spindle.

Figure 11:
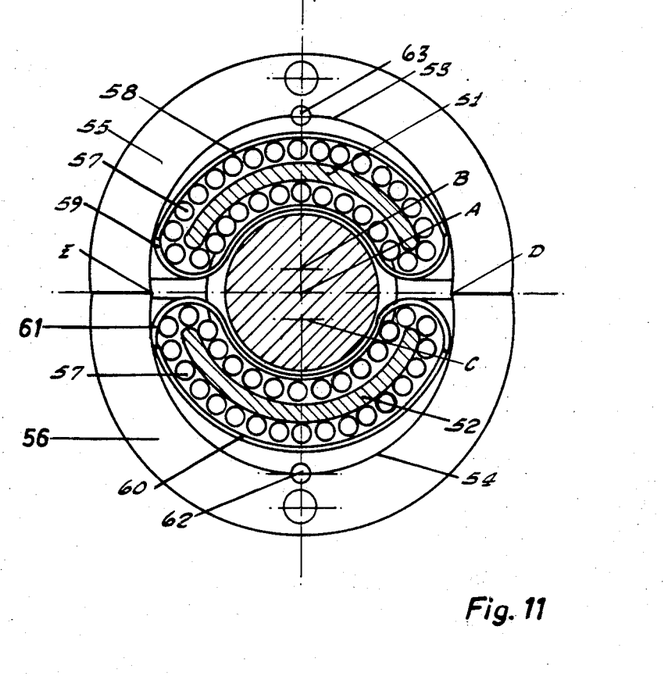
FIG. 11 illustrates another embodied form of the invention in cross-sectional view.

FIG. 11 illustrates an embodied form in which a simple undetachable mounting of the nut halves is rendered possible, a strip support is obtainable for the roller bodies which is simple to manufacture and to mount, and the circularly cylindrical shape of the inner generated surface of the nut halves can be maintained upon the clamping thereof. To this end, in the embodiment of FIG. 11 provision is made that the outer generated surfaces of the nut halves 51, 52 are curved (in cross section) about points B, C, which points are offset, with respect to the spindle axis A about which the inner generated surfaces are curved, in a direction towards the respective nut half. Such a design permits each of the outer generated surfaces of the nut halves to extend through a circular arc of more than 180° and to be held by form fit in housing halves gripping therearound and clamping the nut halves with respect to each other.

Moreover, it is possible that the ratio of inner and outer arcs of the nut halves is selected so that upon a variation of the internal diameter, due to clamping the circular shape of the inner arc, is maintained. Finally, with such a design of the nut halves, retention of the roller bodies may be accomplished in such a manner that the roller bodies in each of the nut halves are surrounded by a strip support comprising one pair of resilient strip elements each, of which one (58, 60) extends along the outer return way of the roller bodies and the other (59, 61) along the inner way of the roller bodies, around the deflecting points and with its ends into the return way so that it is resiliently retained in the nut half.

With respect to the internal diameter, the nut halves 51 and 52 have the common center A coinciding with the spindle. On the outside the nut half 51 has the center B and the nut half 52 the center C so that the two circumferential lines extend in accordance with two circular arcs 53 and 54 which converge at the points D and E. This prevents the nut halves 51 and 52 from dropping out of their housing parts 55 and 56 without any particular mounting.

The nut halves, not the ways of the roller bodies, extending therein are moon-shaped. This moon shape may be provided so that upon clamping of the nut halves to a different diameter the circular shape of the inner roller body guide is maintained.

In this example, the roller bodies are shown as balls. This also applies to all other roller bodies such as cylindrical rollers or tapered rollers.

The design of the nut illustrated herein permits the strip-shaped enclosure of the roller body strand to be divided into two elements each, namely 58, 59, 60 and 61. It is expedient to use a rigid slightly resilient material for this purpose, since the strip elements can be supported and clamped in the outer housings 55 and 56.

In order to prevent the two nut halves 51, 52 from rotating in the respective housing halves 55, 56, recesses are provided at the center on the housing halves and the nut halves, which complement so that each forms a circular bore. Pins 62 and 63 are inserted in these bores. Otherwise, a rotation of the nut halves could result if very great forces are present, leading to a mispositioning of the nut.

I claim:
1. In the combination of a spindle device formed about an axis and having a threaded exterior defined by lands with grooves therebetween and a nut device about said spindle and which has a plurality of recirculating roller bodies interengaging said spindle and device, so that with relative rotation between the devices one device moves longitudinally along the axis with respect to the other device, the improvement comprising:

said nut device being split parallel to said axis,
said nut device defining a plurality of individually continuous ways for said roller bodies, each of said ways comprising a halfway adjacent said spindle and arcuately aligned with said threads and an enclosed way connecting the ends of the halfway, said ways being positioned sequentially with respect to each other along said axis, said roller bodies being positioned in and movable along said ways,
means bearing against said nut device for compressing said nut device radially of said axis to avoid bearing play between the devices, said means comprising a truncated conical exterior configuration of the nut device, a clamping ring which fits snugly about said exterior, and means interconnecting said ring and said nut device for forcing said ring along said exterior of said device in the direction of the larger portion of said truncated conical exterior.

2. In the combination of claim 1, wherein said clamping ring is formed of a plurality of parts and said nut device is formed of a corresponding number of parts, form fit guide means undetachably connecting each part of the ring to a respective nut device part.

3. In the combination of a spindle device formed about an axis and having a threaded exterior defined by lands with grooves therebetween and a nut device about said spindle and which has a plurality of recirculating roller bodies interengaging said spindle and device, so that with relative rotation between the devices one device moves longitudinally along the axis with respect to the other device, the improvement comprising:

said nut device being split parallel to said axis,
said nut device defining a plurality of individually continuous ways for said roller bodies, each of said ways comprising a halfway adjacent said spindle and arcuately aligned with said threads and an enclosed way connecting the ends of the halfway, said ways being positioned sequentially with respect to each other along said axis, said roller bodies being positioned in and movable along said ways,
said nut device comprising a main body with a continuous slot with the main body about the slot defining one side of one of the ways, and a closed retainer strip circumscribing said main body at said slot and defining an opposite side of said way, said retainer strip at the side of said main body adjacent said spindle having a dimension, as measured parallel to said axis, being no greater than the distance between said lands and being positioned in said spindle groove, whereby said roller bodies will be trapped in said way between the main body and the retainer strip and at said adjacent side will bear against said lands.

4. In the combination of claim 3, wherein said strip is formed in two parts, one part extending along said side of the main body adjacent said spindle, the other part encompassing the remainder of the way and having ends at said side of the main body adjacent said spindle.

5. In the combination of a spindle device formed about an axis and having a threaded exterior defined by lands with grooves therebetween and a nut device about said spindle and which has a plurality of recirculating roller bodies interengaging said spindle and device, so that with relative rotation between the devices one device moves longitudinally along the axis with respect to the other device, the improvement comprising:

said nut device being split parallel to said axis,
said nut device defining a plurality of individually continuous ways for said roller bodies, each of said ways comprising a halfway adjacent said spindle and arcuately aligned with said threads and an enclosed way connecting the ends of the halfway, said ways being positioned sequentially with respect to each other along said axis, said roller bodies being positioned in and movable along said ways, said roller bodies having a truncated conical exterior configuration, said lands having tapered side faces which meet in line contact with each truncated conical roller body, and each roller body having a conical axis, the arrangement being such that the extensions of the lines of contact of a roller body with the lands and the extension of that roller body axis intersect at a common point positioned on said spindle device axis, each of said roller bodies having a large end and a small end, said large end being concave, said large end abutting a side of said way, said side of said enclosed way having a crown extending longitudinally therealong.

6. In the combination of a spindle device formed about an axis and having a threaded exterior defined by lands with grooves therebetween and a nut device about said spindle and which has a plurality of recirculating roller bodies interengaging said spindle and device, so that with relative rotation between the devices one device moves longitudinally along the axis with respect to the other device, the improvement comprising:

said nut device being split parallel to said axis,
said nut device defining a plurality of individually continuous ways for said roller bodies, each of said ways comprising a halfway adjacent said spindle and arcuately aligned with said threads and an enclosed way connecting the ends of the halfway, said ways being positioned sequentially with respect to each other along said axis, said roller bodies being positioned in and movable along said ways, said nut device comprising two separate nut halves, each of said halves having a plurality of said individually continuous ways with roller bodies therein, each nut half having an interior face and an exterior face, each interior face, as viewed in a cross section transverse to said axis, being curved about a point located on said axis, each exterior face, as viewed in a cross section transverse to said axis, being curved about a point spaced from said axis in the direction of the respective nut half.

7. In the combination as set forth in claim 6, wherein each exterior face, as viewed in said transverse cross section extends through an arc greater than 180°, said combination including means bearing against said nut device for compressing said nut device radially of said axis to avoid bearing play between the devices, said means comprising two housing halves.

8. In the combination as set forth in claim 7, wherein the ratio of the arc formed by the inner curve to the arc formed by the outer curve is such that upon a variation of the internal diameter of the nut device due to clamping the circular shape of the inner arc is maintained.

9. In the combination of claim 7, in which said nut device comprises a main body with a continuous slot with the main body about the slot defining one side of one of the ways, and a closed retainer strip circumscribing said main body at said slot and defining an opposite side of said way, said retainer strip at the side of said main body adjacent said spindle having a dimension, as measured parallel to said axis, being no greater than the distance between said lands and being positioned in said spindle groove, whereby said roller bodies will be trapped in said way between the main body and the retainer strip and at said adjacent side will bear against said lands.

10. In the combination of claim 9, wherein said strip is formed in two parts, one part extending along said side of the main body adjacent said spindle, the other part encompassing the remainder of the way and having ends at said side of the main body adjacent said spindle.

11. In the combination of a spindle device formed about an axis and having a threaded exterior defined by lands with grooves therebetween and a nut device about said spindle and which has a plurality of recirculating roller bodies interengaging said spindle and device, so that with relative rotation between the devices one device moves longitudinally along the axis with respect to the other device, the improvement comprising:

said nut device being split parallel to said axis, said nut device defining a plurality of individually continuous ways for said roller bodies, each of said ways comprising a halfway adjacent said spindle and arcuately aligned with said threads and an enclosed way connecting the ends of the halfway, said ways being positioned sequentially with respect to each other along said axis, said roller bodies being positioned in and movable along said ways, said nut device comprising two separate nut halves, each of which halves having a plurality of said individually continuous ways with roller bodies therein, means bearing against said nut device for compressing said nut device radially of said axis to avoid bearing play between the devices, said means comprising two housing halves, each nut half having a recess aligned with said axis and each housing half having a recess which mates with the respective nut half recess to form an aperture, and including a pin in each aperture respectively to lock the nut half to the respective housing half against rotation with respect to said axis.

12. In the combination of a spindle device formed about an axis and having a threaded exterior defined by lands with grooves therebetween and a nut device about said spindle and which has a plurality of recirculating roller bodies interengaging said spindle and device, so that with relative rotation between the devices one device moves longitudinally along the axis with respect to the other device, the improvement comprising:

said nut device being split parallel to said axis, said nut device defining a plurality of individually continuous ways for said roller bodies, said ways being positioned sequentially with respect to each other along said axis, each of said ways comprising a halfway adjacent said spindle and arcuately aligned with said threads and an enclosed way connecting the ends of the halfway, said nut device including a retainer strip extending the length of said halfway and positioned in a groove, said roller bodies being positioned in, movable along said ways, bearing against the lands at both sides of a groove, and along the halfway being between the retainer strip and the halfway.